June 30, 1942.  R. BOYER ET AL  2,288,581
ELASTIC WHEEL
Filed Nov. 17, 1938

Inventors:
Robert Boyer,
Marcel Marin,
Michel Gaestel,
Bailey & Carson
Attorneys Patented June 30, 1942

2,288,581

UNITED STATES PATENT OFFICE 2,288,581

ELASTIC WHEEL

Robert Boyer, Paris, Marcel Marin, Neuilly-sur-Seine, and Michel Gaestel, Arcueil, France, assignors to Société "Goodrich" S. A., Bois-Colombes (Seine), France, a society of France Application November 17, 1938, Serial No. 241,068
In Luxemburg November 20, 1937

1 Claim. (Cl. 152—29)

The present invention relates to devices including at least two elements, for instance concentric to each other, connected together by elastic members under tension, such, for example, as rubber rings engaged on pins carried by said elements, respectively. The invention is more especially, although not exclusively, concerned, among these devices, with elastic wheel systems.

The object of the present invention is to provide a device of this type which is better adapted to meet the requirements of practice than similar devices made up to the present time, and, concerning more particularly elastic wheels, to provide a wheel which constitutes in itself, with respect to the structure supported by said wheel, a true suspension, which is not liable to rebounding.

The essential feature of the present invention consists in combining with devices of the type above described, a shock-absorbing system interposed between the elements that constitute said device.

According to an advantageous feature of the present invention, this shock-absorbing system is of a type capable of acting in both directions.

Other features of the present invention will result from the following detailed description of some specific embodiments thereof.

Preferred embodiments of the present invention will be hereinafter described, with reference to the accompanying drawing, given merely by way of example, and in which.

Figure 1:
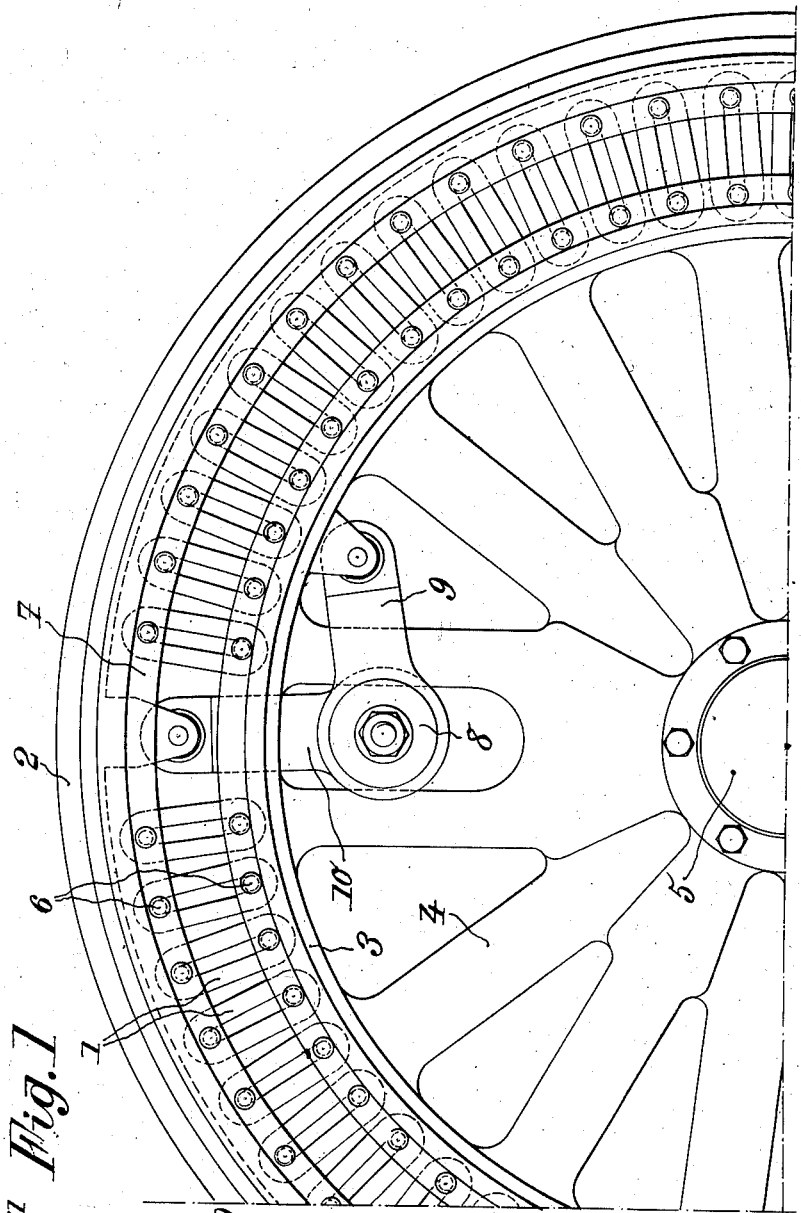
Fig. 1 is a part elevation view of an elastic wheel made according to the present invention.
Figure 2:
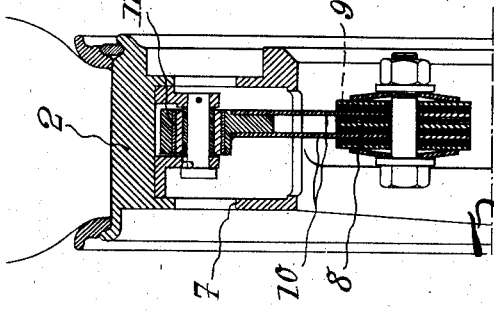
Fig. 2 is a part transverse section of said wheel.

As above stated, the elastic wheel according to the present invention is of the type including two concentric elements, analogous to two rim elements, assembled together by means of elastic members under tension, such as rubber rings.

The general arrangement of this wheel is of any conventional type.

According to the present invention, such a structure is combined with shock-absorbing means for opposing a braking action to relative displacements of the constitutive elements of the wheel with respect to each other, the whole being such that it permits of avoiding the bounding properties of elastic wheels of known types, and that it constitutes, with respect to the structure supported by the wheel, a true suspension system.

Of course, anyone skilled in the art is capable of designing many embodiments of such a combination as above described.

For instance, in order to produce the shock-absorbing effect, we may have recourse to any of the following types:

(a) Making use of friction between solid bodies;

(b) Making use of a friction produced by the flow of a liquid;

(c) Making use of frictional effects belonging to both of the above mentioned types, or to any others.

Furthermore, the value of the friction that is produced may be either of a substantially uniform magnitude for the whole of the relative displacements of the elements with respect to each other, or of a value variable with the importance of the amplitude of said displacements.

Furthermore, the shock-absorbing means are preferably made adjustable through any suitable means, advantageously adapted to act on several shock-absorbing devices simultaneously.

According to the embodiment shown by the drawing, merely by way of example, the rubber rings 1, which give elasticity to the wheel structure, are interposed, on the one hand, between a peripheral rim 2, which may be provided with a solid tire, a pneumatic tire, or the like, and on the other hand the outer rim 3 of a central element 4, arranged for instance in the form of a metallic web, preferably apertured, which is integral or made rigid with the hub 5.

The rims may be of U-shaped section, the pins 6 on which the rubber rings 1 are stretched bearing for instance, at their ends, against the lateral flanges 7 of the rim section.

In this embodiment of our invention, this structure is combined with a plurality of shock absorbers 8 (three in the example shown by the drawing) suitably distributed over the periphery of the wheel and each connected respectively to rims 2 and 3.

In the preferred embodiment shown by the drawing, the shock-absorbers of the combination are of the friction type, as commonly used on vehicles.

As for the connection existing, through the shock-absorbing system, between the inner and outer elements of the wheel, such as 2 and 3, it is preferably capable of ensuring a certain degree of liberty in a direction transverse to the plane of the wheel. For this purpose, we use, for instance, in the case of shock-absorbers connected in a pivoting manner to rims 2 and 3, through arms 9 and 10, any of the following systems:

(a) Ball and socket joints; or (b) As shown by the drawing, articulations with elastic sleeves 11 of the kind of those known in the art as "silent-blocks."

Abutments may, if necessary, be provided, at any suitable points, for limiting the lateral displacement of the two rim elements with respect to each other.

If necessary, any supplementary means may be provided for ensuring a shock-absorbing braking of the lateral relative displacements of the two rim elements. Such a result is obtained, at least within certain limits, by making use of silent-blocks.

Finally, in particular when use is made of rim elements of U-shaped section, the shock-absorbers may be mounted, as shown by the drawing, on the inside of the wheel, that is to say substantially in the median plane of said section.

The explanations above given concerning the structure of the combination according to the present invention are believed to be sufficient for a good understanding of the operation of said structure.

An elastic wheel or other structure made according to the present invention as above set forth has, over similar systems made up to the present time, the following advantages:

It constitutes a true suspension since, while having the desired elasticity owing to the presence of springs or rings 1, said structure is capable of absorbing the expansion energy of said springs or rings before dangerous harmonics can be set up, owing to the provision of shock absorbers.

Furthermore, it constitutes a system which allows for a certain lateral relative displacement of the rim elements, this lateral displacement being as limited as desired.

There are many applications of the present invention, in particular in the case of wheels of road vehicles (touring cars or heavy vehicles) or track vehicles, for agricultural machines, for artillery, and so on. It would also be applicable to elastic pulleys or fly-wheels so as to permit the automatic tensioning of belts, chains, or the like, and to avoid shocks in transmissions. It would also be well adapted to the construction of rollers or friction wheels for transmissions, to elastic couplings between two shafts, the central part of the device being then fixed to one of the shafts and the other part to the other shaft.

In a general manner, while we have, in the above description, disclosed what we deem to be practical and efficient embodiments of the present invention, it should be well understood that we do not wish to be limited thereto as there might be changes made in the arrangement, disposition and form of the parts without departing from the principle of the present invention as comprehended within the scope of the accompanying claim.

What we claim is:

In combination, at least two circular elements of different respective diameters disposed concentrically one around the other, elastic members for connecting elastically said elements whereby the elements are capable of limited relative movement with respect to each other in the plane of said elements as well as in directions transversely of said plane, shock absorbing means connected between said elements and operative by the relative radial movements of the same, and second means connecting said shock absorbing means to at least one of said elements for limited relative movement therebetween in a direction transverse to the plane of said elements, said last-named means including silent blocks.

ROBERT BOYER.
MARCEL MARIN.
MICHEL GAESTEL.